United States Patent [19]
Mikuni et al.

[11] Patent Number: 5,807,913
[45] Date of Patent: Sep. 15, 1998

[54] ACRYLIC RUBBER COMPOSITION

[75] Inventors: Kenji Mikuni, Fujisawa; Hisayuki Nagaoka, Kanzaki county; Norio Tanaka, Handa, all of Japan

[73] Assignees: NOK Corporation, Tokyo; Denso Corporation, Aichi, both of Japan

[21] Appl. No.: 760,864

[22] Filed: Dec. 5, 1996

[30] Foreign Application Priority Data

Dec. 8, 1995 [JP] Japan .................................. 7-345770

[51] Int. Cl.⁶ .................................................. C08K 5/53
[52] U.S. Cl. .................... 524/131; 524/130; 524/132; 524/136; 524/139
[58] Field of Search ................................ 524/130, 131, 524/136, 139, 132

[56] References Cited

U.S. PATENT DOCUMENTS

| | | | |
|---|---|---|---|
| 3,624,029 | 11/1971 | Yokohama-Shi et al. | 526/295 |
| 3,855,382 | 12/1974 | Takeya et al. | 524/139 |
| 3,963,437 | 6/1976 | LeBlanc et al. | 524/131 X |
| 3,976,610 | 8/1976 | Morris et al. | 526/296 X |
| 4,022,852 | 5/1977 | Vollmer | 524/131 X |
| 4,524,185 | 6/1985 | Hinderer | 525/328.9 |
| 4,611,018 | 9/1986 | Derencsenyi | 524/130 |
| 4,751,260 | 6/1988 | Kress et al. | 524/130 |
| 5,079,299 | 1/1992 | Hisamoto et al. | 524/130 X |
| 5,241,010 | 8/1993 | Yokoi | 525/328.9 |

FOREIGN PATENT DOCUMENTS

| | | | |
|---|---|---|---|
| 43 43 057 | 6/1994 | Germany . | |
| 49-13215 | 3/1974 | Japan . | |
| 154442 | 12/1979 | Japan | 524/139 |
| 5927 | 1/1980 | Japan | 524/139 |
| 0055444 | 5/1981 | Japan | 524/130 |
| 0098150 | 6/1984 | Japan | 524/131 |
| 1004746 | 1/1985 | Japan | 524/130 |
| 0009356 | 1/1993 | Japan | 524/131 |
| 0025343 | 2/1993 | Japan | 524/131 |
| 8-041271 | 2/1996 | Japan . | |
| 5-148476 | 6/1996 | Japan . | |
| 1567587 | 5/1990 | U.S.S.R. | 524/130 |

*Primary Examiner*—Judy M. Reddick
*Attorney, Agent, or Firm*—Kenyon & Kenyon

[57] ABSTRACT

An active halogen-containing acrylic rubber composition for molding oil filter-gaskets, which comprises an active halogen-containing acrylic rubber and a metal phosphonate represented by the following general formula:

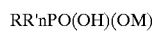

RR'nPO(OH)(OM)

wherein R is an alkyl group having 1 to 32 carbon atoms, a polyfluorocarbon group or a perfluoropolyether group; R' is an alkylene group having 1 to 6 carbon atoms, a phenylene group, an oxyphenylene group or a sulfonamide group; M is an alkali metal; and n is 0 or 1, gives oil filter-gaskets having a distinguished durable protection against fixation without lowering of high temperature sealability, even if used in engine oil.

10 Claims, No Drawings

ACRYLIC RUBBER COMPOSITION

BACKGROUND OF THE INVENTION

1. Field of the Invention

The present invention relates to an active halogen-containing acrylic rubber composition, and more particularly to an active halogen-containing acrylic rubber composition for molding oil filter-gaskets with a good protection against metal adhesion.

2. Description of Related Art

Oil filter-gaskets are provided on engine bodies to filter engine oil, and high temperature sealability (e.g. compression set and engine oil resistance) and low temperature sealability are required for the oil filter-gaskets owing to their service conditions. Furthermore, cost reduction of the oil filter-gaskets is required because they contain exchangeable parts and thus materials with a good productivety have been desired for them.

Acrylic rubber for low temperature service, which has a glass transition temperature Tg of not higher than $-30°$ C., is a satisfactory material for these requirements. Acrylic rubber having active halogens as cross-linkable groups, which was cross-linked with trithiocyanuric acid, was disclosed in JP-B-49-13215. The disclosed acrylic rubber has a good high temperature sealability (e.g. compression set and oil resistance) and also a good low temperature sealability and furthermore has such a characteristic that the production efficiency is quite better due to rapid cross-liking reaction. Thus the disclosed acrylic rubber has been effectively used also as a vulcanization-molding material for oil filter-gaskets (JP-A-5-148476).

However, oil filter-gaskets are taken into fixation with the metal of engine bodies in direct contact with the oil filter-gaskets, and in case of exchanging oil filters, the old rubber is hard to remove away completely. When the parts are exchanged in such an incomplete state, the sealability will be inevitably lowered.

The term "fixation" herein used means such a hard-to-remove state of a seal rubber, even if it is tried to remove the seal rubber away from a contacting material, when the seal rubber and the contacting material are about 10 to about 40% compressed and left in air or service oil at a given temperature for a given period of time, the seal rubber and the contacting material undergo reaction and consequent strong adhesion to each other. Among available various contacting materials, cast iron is the most important material of the fixation problem.

To solve the fixation problem, the following methods have been so far proposed, but are not satisfactory yet:

(1) A method of mixing the rubber with a relatively large amount of a plasticizer, a lubricant, etc. for bleeding or blooming from the rubber, thereby preventing direct contacting with the counterpart material. The proposed method is most economical, but only bleeding or blooming is not sufficient for protection against the fixation, but the rubber physical properties are also largely lowered.

(2) A method of depositing a solid lubricant or a silicone coating agent onto rubber. In case of depositing a solid lubricant, solid lubricants such as graphite, molybdenum disulfide, etc. are easy to liberate and their efficiency is not constant. Furthermore, there is a high possibility that oil, etc. are contaminated with the liberated solid lublicants as foreign matters. In case of depositing a silicone coasting agent, similar problems can be encountered.

(3) A method of coating a sealing material with a composition comprising a rubber-based binder and a solid lubricant as main components, as dispersed in a solvent. This method generally suffers from poor adhesion of the composition to the sealing matarial and has no sufficient effect on protection against fixation, are also has a very high processing cost.

(4) A method of fluorinating the surface with a fluorine gas, etc. This method is distinguished in the protection against the fixation, but has a problem in the treatment cost.

(5) A method of hardening the surface. According to the method the surface id hardened by treatment with a polythiol compound, an amine, an organic peroxide or the like. This method is distinguished in the protection against the fixation but has such problems as cracking, etc. when deformed.

SUMMARY OF THE INVENTION

An object of the present invention is to provide an active halogen-containing acrylic rubber composition containing a fixation-protecting agent, capable of providing oil filter-gaskets having a distinguished durable protection against fixation and free from lowering of high temperature sealability, even if used in engine oil.

According to the present invention, there is provided an active halogen-containing acrylic rubber composition for molding oil filter-gaskets, which comprises an active halogen-containing acrylic rubber and a metal phosphonate represented by the following general formula:

wherein R is an alkyl group having 1 to 32 carbon atoms, a polyfluorocarbon group or a perfluoropolyether group; R' is an alkylene group having 1 to 6 carbon atoms, a phenylene group, an oxyphenylene group or a sulfonamide group; M is an alkali metal; and n is 0 or 1.

DETAILED DESCRIPTION OF THE INVENTION

Acrylic rubber for use in the present invention is generally a copolymer comprising alkyl acrylate with an alkyl group having 1 to 8 carbon atoms as the main component or a copolymer comprising alkyl acrylate with an alkyl group having 1 to 8 carbon atoms and alkoxyalkyl acrylate with an alkoxy-alkyl group having 2 to 8 carbon atoms as the main components, further copolymerized with about 0.1 to about 10% by weight, preferably about 0.5 to about 5% by weight of an active halogen-containing monomer capable of forming a cross-linkable group on the basis of the copolymer.

Active halogen-containing monomer for use in the present invention includes, for example, the following compounds, where those having other halogen groups than halogen groups of low activity derived from alkyl halides such as 2-chloroethyl vinyl ether, 2-chloroethyl acrylate, etc. are used:

(1) Vinylbenzyl chloride, etc., (2) Vinyl chloroacetate, allyl chloroacetate, etc., (3) Addition reaction products of a glycidyl compound such as glycidyl acrylate, glycidyl methacrylate, allyl glycidyl ether, etc. with monochloroacetic acid, or (4) Alkenyl esters of α- or β-halogen-substituted aliphatic monocarboxylic acid, haloalkyl esters of acrylic acid or methacrylic acid, haloalkyl alkenyl esters, haloalkyl alkenyl ketones, haloacetoxyalkyl esters of acrylic acid or methacrylic acid, haloacetyl-containing unsaturated compouns, etc.

Not more thsn about 30% by weight, preferably not more than about 10% by weight of at least one of vinyl compounds and olefin compound, each copolymerizable with one of the above-mentioned monomers can be further copolymerized.

Needless to say, the acrylic rubber must have a glass transition temperature of not higher than −30° C., when used as a vulcanization-molding material for oil filter-gaskets.

Sulfur, etc. can be used as a cross-linking agent for the active halogen-containing acrylic rubber, but generally about 0.1 to about 5 parts by weight, preferably about 0.25 to about 3 parts by weight of trithiocyanuric acid (2,4,6-trimercapto-s-triazine) can be used per 100 parts by weight of active halogen-containing acrylic rubber. A cross-linking promoter is preyferably used together with the trithiocyanuric acid cross-linking agent. The cross-linking promoter includes, for example, metal salts of dialkyldithiocarbamic acid with an alkyl group having 1 to 4 carbon atoms such as zinc dibuytl-dithiocarbamate, zinc diethyldithiocarbamate, zinc dimethyl-dithiocarbamate, etc.

In the metal phosphonate represented by the following general formula:

RR'nPO(OH)(OM)

for use as a fixation-protecting agent for the active halogen-containing acrylic rubber, the following members are used for R, R' and M:

R: alkyl groups having 1 to 32 carbon atoms, such as ethyl, butyl, octyl, dodecyl, etc.; polyfluorocarbon groups, for example, perfluoroalkyl groups having 4 to 16 carbon atoms, such as $C_4F_9$, $C_6F_{13}$, $C_8F_{17}$, $C_{10}F_{21}$, $C_{12}F_{25}$, $C_{14}F_{29}$, etc. in general, and also perfluoroalkyl groups having one unsaturated bond or with hydrogen atoms or chlorine atoms substituted for some of fluorine atoms, or perfluoroalkyl groups having the following trifluoromethyl groups as side chains:

$C_2F_5[CF(CF_3)CF_2]n(CF_2CF_2)m$—, and $CF(CF_3)_2(CF_2CF_2)n$— where these polyfluorocarbon groups having 1 to 32 carbon atoms, preferably 4 to 16 carbon atoms; and perfluoropolyether groups such as:

$CF_3O(CF_2CF_2CF_2O)n$—, $C_2F_5O(CF_2CF_2CF_2O)n$—, $C_3F_7O[CF(CF_3)CF_2O]n$—, $F(CF_2CF_2O)n(CF_2O)m$—, $CF_3O(CF_2CF_2O)n(CF_2O)m$—, $CF_3O(CF_2CF_2O)n(CF_2O)m[CF(CF_3)CF_2O]k$— or $C_2F_5O(CF_2CF_2O)n(CF_2O)m[CF(CF_3)CF_2O]k$— where n, m and k each are integers of 1 or more, preferably 1 to 100.

R': alkylene groups having 1 to 6 carbon atoms, such as ethylene, trimethylene, etc., where if in case of R being an alkyl group and total carbon atoms of R and R' being 7 or less, the protection against fixation is deteriorated in engine oil, and thus selection should be made to make total carbon atoms of R and R' 8 or exceed 8; a phenylene groups; oxyphenylene groups; and sulfonamide groups represented by the general formula —$SO_2NR''$—, where R'' is a hydrogen atom or a lower alkyl group having 1 to 5 carbon atoms.

M: alkali metals such as lithium, sodium, potassium, etc.

About 0.1 to about 20 parts by weight, preferably about 0.5 to about 10 parts by weight, of the metal phosphonate can be used per 100 parts by weight of the active halogen-containing acrylic rubber. Above about 20 parts by weight, the physical properties of materials are deteriorated. In case of using other metal salts or disubstituted salt instead, the protection against fixation is not satisfactory. In case of using free phosphonic acid, the free phosphonic acid will inhibit the cross-linking reaction between the active halogen and the trithiocyanuric acid. Thus it is necessary to use the monosubstituted salt of alkali metal as a metal phosphonate.

The composition can be prepared from the above-mentioned components together with other additives such as a reinforcing agent, a filler, an antioxidant, a stabilizer, a plasticizer, a pigment, etc. according to the ordinary procedure such as roll mixing, Bambury mixing, solution mixing, etc. Its vulcanization can be carried out by press vulcanization (primary vulcanization) at a temperature of about 150° to 200° C. for a duration of about 5 to about 20 minutes and by oven vulcanization (secondary vulcanization) or steam vulcanization at a temperature of about 150° to about 180° C. for a duration of about 2 to about 15 hours.

According to the present invention, vulcanization-molding products that can satisfy the desired high temperature seelability without causing any fixation with the counterpart metal, when used as oil filter-gaskets, can be obtained by cross-linking active halogen-containing acrylic rubber containing a metal phosphonate with trithiocyanuric acid, etc.

PREFERRED EMBODIMENTS OF THE INVENTION

The present invention will be described in detail below, referring to Examples and Comparative Examples.

Example 1

The following components were kneaded through an open roll and the resulting kneading mixture was subjected to press vulcanization at 170° C. for 15 minutes and oven vulcanization at 175° C. for 4 hours to vulcanization-mold oil filter-gaskets:

|  | Parts by weight |
|---|---|
| Active chlorine-containing acrylic rubber (Noxtite PA-404 N, trademark of a product made by Nippon Mektron K.K., Japan) | 100 |
| Stearic acid | 1 |
| 4,4'-(α,α-dimethylbenzyl)diphenylamine | 2 |
| SRF carbon black | 100 |
| Ester-ether-based plasticizer (RS-700, trademark of a product made by Asahi Denka K.K., Japan) | 10 |
| Trithiocyanuric acid | 0.5 |
| Zinc dibutyldithiocarbamate | 1.5 |
| $(C_2H_5)SO_2N(C_3H_7)(CH_2)_2PO(OH)(ONa)$ | as given in Table 1 |

The resulting vulcanization-molding products were subjected to determination of the following test items and evaluation.

Test on protection against fixation: The vulcanization-molding gasket was fixed to an oil filter, and the oil filter-gasket was further fixed to a cast iron mount cut out of an engine block. Then, the mount was dipped into engine oil (Toyota Ultrapure Castle Clean SG) and kept at 140° C. for 500 hours. Then, the gasket part was taken out to observe the state of fixation of the gasket with the base. Evaluation was made according to the following levels:

O: No fixation, Δ: slight fixation, x: strong fixation

Compression set test: The oil filter was cut into a ⅓ piece, and the piece was 25% compressed in engine oil at 150° C. for 70 hours according to JIS K-6301.

The results are shown in Table 1 together with the amount of metal phosphonate used. Vulcanization state at the press vulcanization was found to be good in case of Nos. 1 to 6, and slight deformation was observed in case of No.7. The press vulcanization time was extended to 30 minutes in case of No.8.

TABLE 1

| No. | Metal phosphonate (Parts by weight) | Protection against fixation | Compression set (%) |
| --- | --- | --- | --- |
| 1 | 0 | x | 35 |
| 2 | 0.1 | Δ to O | 34 |
| 3 | 0.5 | O | 34 |
| 4 | 3 | O | 35 |
| 5 | 5 | O | 35 |
| 6 | 10 | O | 37 |
| 7 | 20 | O | 42 |
| 8 | 25 | O | 50 |

Examples 2 to 3 and Comparative Examples 1 to 4

In No.5 of Example 1, other metal phosphonates or phosphonic acid, as given below, were used in the same amount.

| Example 2 | $(C_2H_5)SO_2N(C_3H_7)(CH_2)_2PO(OH)(OK)$ |
| --- | --- |
| Example 3 | $(C_2H_5)SO_2N(C_3H_7)(CH_2)_2PO(OH)(OLi)$ |
| Comp. Ex. 1 | $(C_2H_5)SO_2N(C_3H_7)(CH_2)_2PO(OH)_2$ |
| Comp. Ex. 2 | $(C_2H_5)SO_2N(C_3H_7)(CH_2)_2PO(ONa)_2$ |
| Comp. Ex. 3 | $(C_2H_5)SO_2N(C_3H_7)(CH_2)_2PO(O\,½\,Zn)_2$ |
| Comp. Ex. 4 | $(C_2H_5)SO_2N(C_3H_7)(CH_2)_2PO(O\,½\,Mg)_2$ |

The results are given in Table 2. Vulcanization state at press vulcanization was found to be good in case of Examples 2 to 3 and Comparative Example 2, but slight deformation was observed in case of Comparative Examples 3 to 4. The press vulcanization time was extended to 30 minutes in of Comparative Example 1.

TABLE 2

| | Protection against fixation | Compression set (%) |
| --- | --- | --- |
| Example 2 | O | 39 |
| Example 3 | O | 41 |
| Comp. Ex. 1 | O | 80 |
| Comp. Ex. 2 | Δ to x | 34 |
| Comp. Ex. 3 | Δ to x | 48 |
| Comp. Ex. 4 | Δ to x | 50 |

Examples 4 to 11

In No. 5 of Example 1, other metal phosphonates, as given below, were used in the same amount.

| Example 4 | $(C_2H_5)SO_2N(C_3H_7)(p\text{-}C_6H_4)PO(OH)(ONa)$ |
| --- | --- |
| Example 5 | $(C_2H_5)SO_2N(C_3H_7)(p\text{-}C_6H_4O)PO(OH)(ONa)$ |
| Example 6 | $(C_2H_5)SO_2NH(CH_2)_2PO(OH)(ONa)$ |
| Example 7 | $(C_2H_5)SO_2N(CH_3)(CH_2)_2PO(OH)(ONa)$ |
| Example 8 | $(C_4H_9)SO_2N(C_3H_7)(CH_2)PO(OH)(ONa)$ |
| Example 9 | $(C_4H_9)(p\text{-}C_6H_4)PO(OH)(ONa)$ |
| Example 10 | $(C_4H_9)(p\text{-}C_6H_4O)PO(OH)(ONa)$ |
| Example 11 | $(C_8F_{17})(CH_2)_2PO(OH)(ONa)$ |

The results are shown in Table 3. Vulcanization state at the press vulcanization was found to be good in all the cases.

TABLE 3

| | Protection against fixation | Compression set (%) |
| --- | --- | --- |
| Example 4 | O | 38 |
| Example 5 | O | 38 |
| Example 6 | O | 37 |
| Example 7 | O | 36 |
| Example 8 | O | 38 |
| Example 9 | O | 36 |
| Example 10 | O | 36 |
| Example 11 | O | 36 |

What is claimed is:

1. An active halogen-containing acrylic rubber composition for molding oil filter-gaskets, which comprises an active halogen-containing acrylic rubber and a metal phosphonate represented by the following formula:

$$RR'nPO(OH)(OM)$$

wherein R is an alkyl group having 1 to 32 carbon atoms, a polyfluorocarbon group or a perfluoropolyether group; R' is an alkylene group having 1 to 6 carbon atoms, a phenylene group, an oxyphenylene group or a sulfonamide group; M is an alkali metal; and n is 0 or 1.

2. An active halogen-containing acrylic rubber composition for molding oil filter-gaskets according to claim 1, wherein the active halogen-containing acrylic rubber is a copolymer comprising alkyl acrylate with an alkyl group having 1 to 8 carbon atoms as the main component or a copolymer comprising alkyl acrylate with an alkyl group having 1 to 8 carbon atoms and alkoxyalkyl acrylate with an alkoxyalkyl group having 2 to 8 carbon atoms as the main components, further copolymerized with about 0.1 to about 10% by weight of an active halogen-containing monomer capable of forming a cross-linkable group on the basis of the copolymer.

3. An active halogen-containing acrylic rubber composition for molding oil filter-gaskets according to claim 2, wherein the active halogen-containing monomer is (1) vinylbenzyl chloride, (2) vinyl chloroacetate or allyl chloroacetate, (3) addition reaction products of a glycidyl compound with monochloroacetic acid or (4) alkenyl esters of α- or β-halogen-substituted aliphatic monocarboxylic acid, haloalkyl esters of acrylic acid or methacrylic acid, haloalkyl alkenyl esters, haloalkyl alkenyl ketones, haloacetoxyalkyl esters of acrylic acid or methacrylic acid or haloacetyl-containing unsaturated compounds.

4. An active halogen-containing acrylic rubber composition for molding oil filter-gaskets according to claim 1, wherein the active halogen-containing acrylic rubber has a glass transition temperature of not higher than −30° C.

5. An active halogen-containing acrylic rubber composition for molding oil filter-gaskets according to claim 1, wherein about 0.1 to about 20 parts by weight of the metal phosphonate is used per 100 parts by weight of the active halogen-containing acrylic rubber.

6. An active halogen-containing acrylic rubber composition for molding oil filter-gaskets according to claim 1, wherein trithiocyanuric acid is further contained as a cross-linking agent.

7. An active halogen-containing acrylic rubber composition for molding oil filter-gaskets according to claim 6, wherein about 0.1 to about 5 parts by weight of the trithiocyanuric acid is used per 100 parts by weight of the active halogen-containing acrylic rubber.

8. An active halogen-containing acrylic rubber composition for molding oil filter-gaskets according to claim 6, wherein a cross-linking promoter is used together with the trithiocyanuric acid cross-linking agent.

9. An active halogen-containing acrylic rubber composition for molding oil filter-gaskets according to claim 8, wherein the cross-linking promoter is a metal salt of dialkyldithiocarbamic acid.

10. An active halogen-containing acrylic rubber composition for molding oil filter-gaskets according to claim 9 wherein the metal salt of dialkyldithiocarbamic acid is a zinc salt.

* * * * *